United States Patent [19]

Carmona

[11] Patent Number: 5,533,762
[45] Date of Patent: Jul. 9, 1996

[54] ASSEMBLY DEVICE OF AN ELEMENT ON A PART PRESENTING A FLUID CHANNEL

[75] Inventor: Henri Carmona, Domène, France

[73] Assignee: Assistance Proto Industrie France, Meylan, France

[21] Appl. No.: 381,993

[22] PCT Filed: Jul. 7, 1994

[86] PCT No.: PCT/FR94/00845

§ 371 Date: Feb. 15, 1995

§ 102(e) Date: Feb. 15, 1995

[87] PCT Pub. No.: WO95/02147

PCT Pub. Date: Jan. 19, 1995

[30] Foreign Application Priority Data

Jul. 9, 1993 [FR] France ............... 93 08524

[51] Int. Cl.$^6$ .................................................. F16L 17/02
[52] U.S. Cl. ........................... 285/101; 285/375; 285/320
[58] Field of Search ........................... 285/95, 101, 375, 285/320

[56] References Cited

U.S. PATENT DOCUMENTS

| | | | |
|---|---|---|---|
| 1,474,270 | 11/1923 | Lewis | 285/375 X |
| 1,719,223 | 7/1929 | Grohek. | |
| 1,744,467 | 1/1930 | Greene. | |
| 1,952,451 | 3/1934 | Mitchell | 285/375 X |
| 2,391,885 | 1/1946 | Deshields. | |
| 2,476,777 | 7/1949 | Smith | 285/375 X |
| 3,001,804 | 9/1961 | Tomlinson et al. | |
| 3,291,442 | 12/1966 | Cranage | 285/101 X |
| 3,319,979 | 5/1967 | Herold et al. | 285/101 X |
| 3,339,832 | 9/1967 | Duecker. | |
| 3,494,641 | 2/1970 | Caregnato. | |
| 3,843,171 | 10/1974 | Hewlett | 285/375 X |
| 3,899,199 | 8/1975 | Garey | 285/101 X |
| 5,163,722 | 11/1992 | Worden | 285/101 X |
| 5,209,528 | 5/1993 | Weh | 285/375 X |
| 5,303,959 | 4/1994 | Medsker | 285/375 X |
| 5,390,963 | 2/1995 | Namekawa | 285/375 |

FOREIGN PATENT DOCUMENTS

| | | |
|---|---|---|
| 0428120 | 5/1991 | European Pat. Off. . |
| 467426 | 2/1969 | Switzerland . |

*Primary Examiner*—Dave W. Arola
*Attorney, Agent, or Firm*—Oliff & Berridge

[57] ABSTRACT

An assembly device (1) of a first element (4) on a tubular part (3) equipped with a fluid channel comprises a second element (9) slidingly mounted with respect to said first element (4). A first axial through passage (35) is arranged in the second element (9), and coupling arms (26) securedly unite the first element (4, 37) to the part (3) in a predetermined axial position, in which the second element (9) presses axially around an opening of the fluid channel of said part (3), allowing communication of the channel with said first axial passage (35). A first seal (16) is fitted between the second element (9) and the part (3), and an internal space (19) extends in the axial direction between opposite faces (6, 18) respectively of the first and second elements (4, 9), said space being in communication with the first axial passage (35) of the second element (9), in such a way that the fluid pressure in the space (19) urges the second element (9) against the part (3). The crushing force of the first seal (16) is dependent on the fluid pressure.

15 Claims, 2 Drawing Sheets

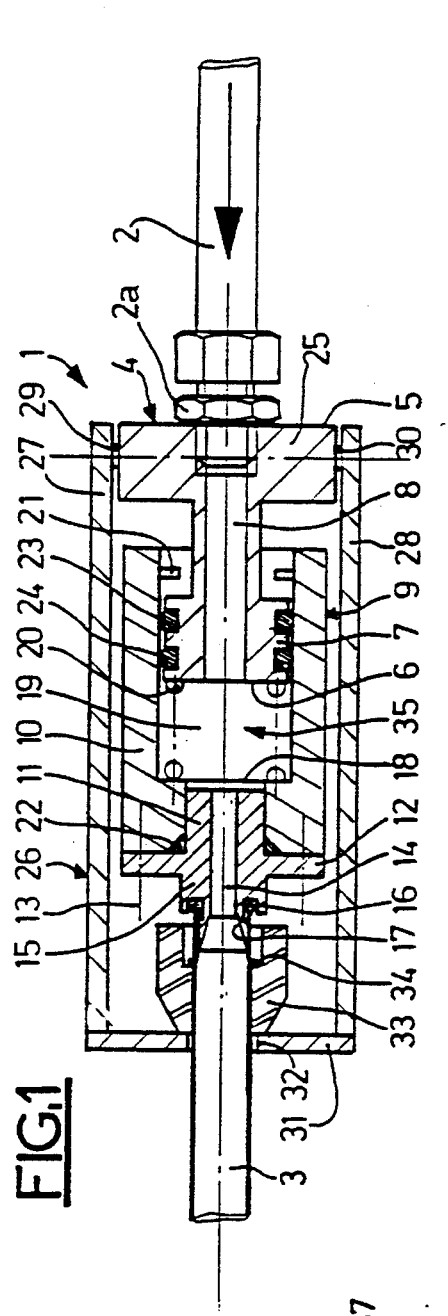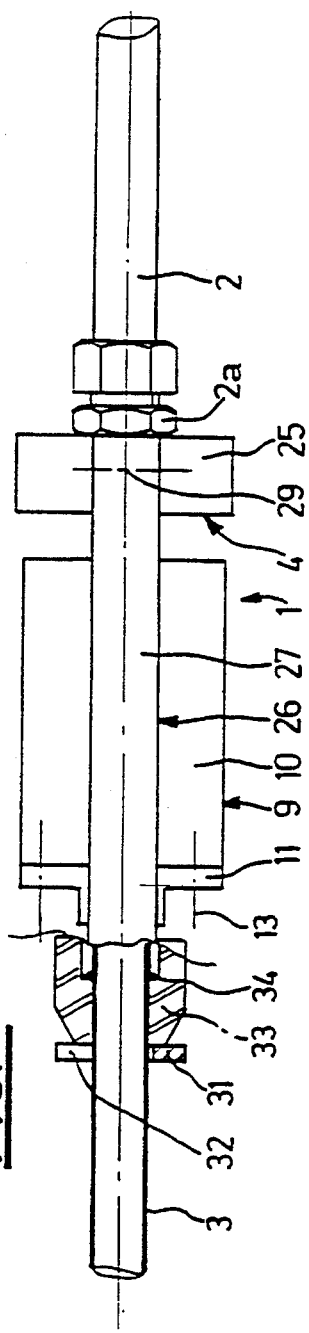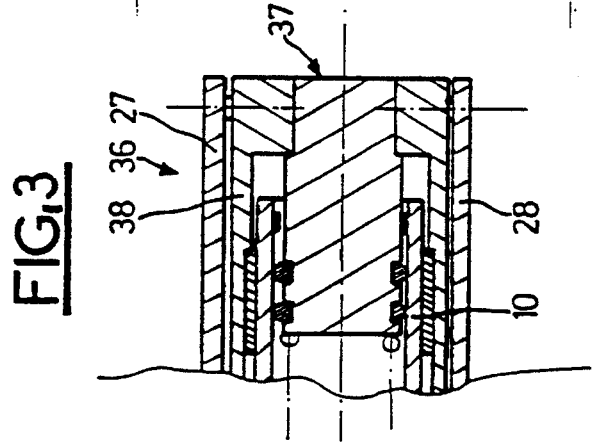

ASSEMBLY DEVICE OF AN ELEMENT ON A PART PRESENTING A FLUID CHANNEL

BACKGROUND OF THE INVENTION

The present invention relates to an assembly device of a first element on a tubular part equipped with a fluid channel, and comprising a second element slidingly mounted with respect to said first element.

STATE OF THE ART

When the fluid channels of parts, notably ducts, are to be connected, this gives rise on the one hand to tightness problems if the fluid pressure is relatively high and on the other hand to mechanical connection problems if one of the parts has to be interchanged with other parts. This is the case in particular in apparatuses for testing the pressure resistance of components such as radiators or heat exchangers of heat generating units which can present connecting end-pieces of different sizes. The same problems arise when the end of a channel of a part is to be blanked off, notably of a duct under pressure.

The document U.S. Pat. No. 3,001,804 refers to a tight connection device between two tubular components, which comprise two end-pieces axially engaged in one another to form a telescopic assembly. Tightness is achieved by means of two O-ring seals housed in coaxial annular grooves and having the same diameters. Such a device constitutes a sliding static tightness, allowing linear expansions when the duct is subjected to temperature changes or mechanical stresses.

SUMMARY OF THE INVENTION

The object of the invention consists in improving the tightness of two connected pads, subjected to fluids under pressure.

The assembly device according to the invention is characterized in that:
  a first axial through passage is arranged in the second element,
  coupling means securely unite the first element to the part in a predetermined axial position, in which the second element presses axially around an opening of the fluid channel of said part, allowing communication of the channel with said first axial passage,
  a first seal is fitted between the second element and the part,
  and an internal space extends in the axial direction between opposite faces respectively of the first and second elements, said space being in communication with the first axial passage of the second element, in such a way that the fluid pressure in the space urges the second element against the part, the crushing force of the first seal depending on the fluid pressure.

According to a first embodiment of the invention, the second element may comprise a removable head which forms the tight bearing on said part. Thus, the device of the invention can present heads of any shape to fit second parts of conjugate shapes.

According to a feature of the invention, a spring can advantageously be fitted between said first and second elements, the action of the spring urging the head into abutment against the part to increase the tightness. The spring preferably extends inside the space, between the opposite surfaces of said elements.

According to another feature, the connection device can advantageously comprise stop means limiting the axial movement of said first and second elements with respect to one another.

According to a preferred embodiment, the coupling means comprise at least one arm mounted pivoting on said first element and designed to come into engagement with a retaining component of said part.

According to another alternative embodiment, the first element is formed by a blanking plug.

According to another alternative embodiment, the tightness of the internal space filled with fluid under pressure is ensured by means of a bellows, which can be made of either metal, or plastic, or rubber material.

DESCRIPTION OF THE DRAWINGS

Other advantages and features will become more clearly apparent from the following description of different types of devices according to the invention given as non-restrictive examples only and represented in the accompanying drawings, in which:

FIG. 1 represents a longitudinal section of an assembly device according to the invention to connect two ducts;

FIG. 2 represents an external top view of the device of FIG. 1;

FIG. 3 shows a partial longitudinal section of the assembly device of FIG. 1, adapted to blank off a duct;

DETAILED DESCRIPTION OF THE INVENTION

Figure 4:
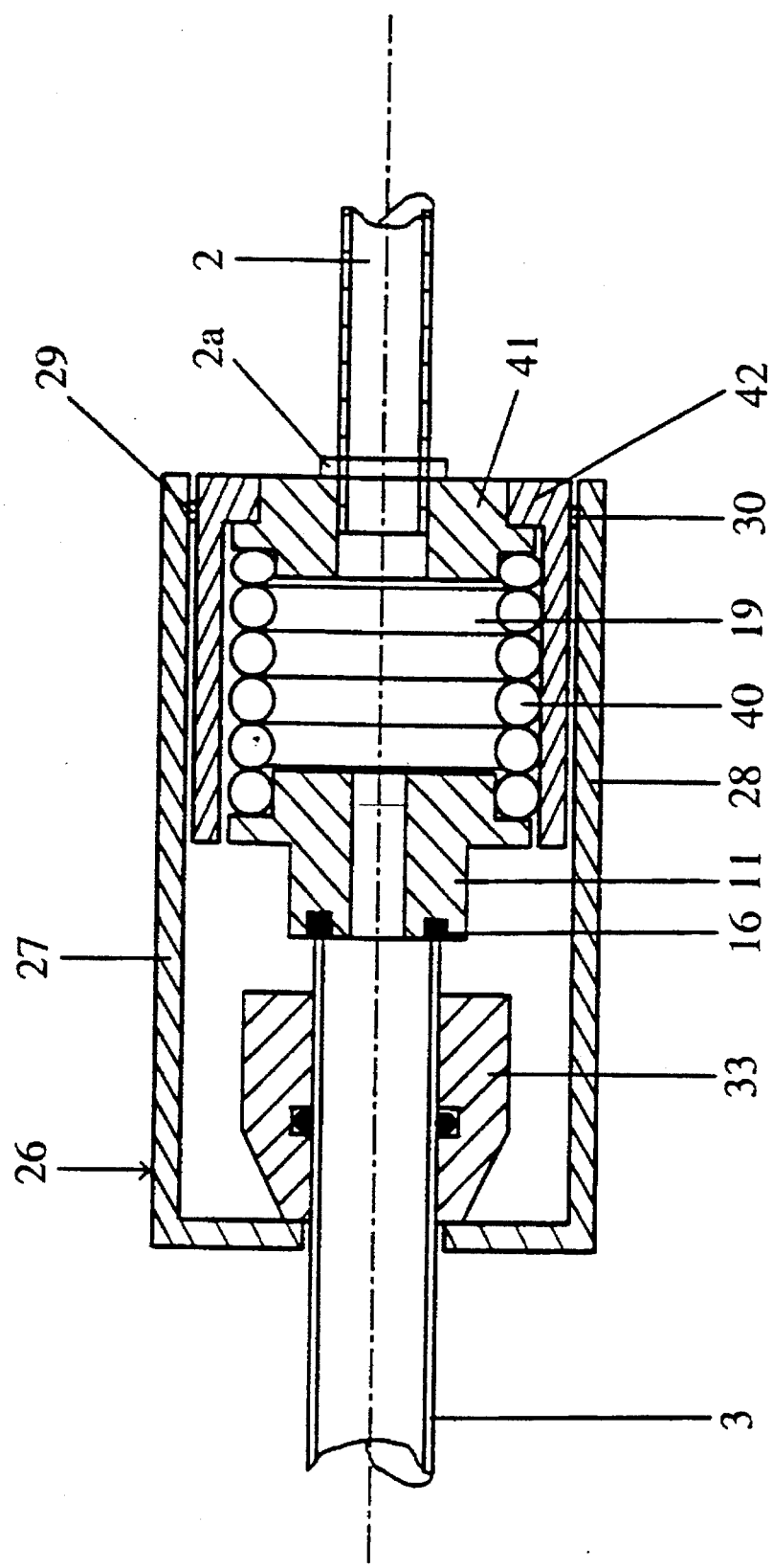
FIG. 4 is an identical view to FIG. 1, representing an alternative embodiment.

The assembly device represented in FIGS. 1 and 2 constitutes a connection device, designated in a general manner by reference 1, and designed to connect the rigid end of a duct 2 presenting a first fluid channel to the rigid end of a duct 3 presenting a second fluid channel.

The duct 2 can be connected to a pressure source, notably of a test bench, and the duct 3 can be connected to a pressure testing apparatus.

The connection device 1 comprises a first element 4 of general cylindrical cross-section, presenting a rear face 5, a front face 6, a cylindrical peripheral front part 7 and an axial passage 8.

The connection device 1 also comprises a second element 9 of general cylindrical cross-section. This element 9, in two parts, comprises a sleeve 10 in which there is engaged, for axial sliding, the front part 7 of the element 4, and a removable head 11 fixed against the radial front face 12 of the sleeve 10 by means of longitudinal screws 13.

The head 11, engaged from the rear in the sleeve 10, presents an axial passage 14 and a protuberance 15 equipped on the front face with an annular seal 16. The protuberance 15 in addition presents an axial cylindrical extension 17 designed to engage in the channel of the duct 3.

The sleeve 10 presents internally a radial face 18 axially separated from the front radial face 6 of the first element 4, to bound an internal space 19. A spring 20 is located between the faces 6 and 18, urging separation in the axial direction of the sleeve 10 and of the first element 4.

The sleeve 10 of the second element 9 presents an internal protrusion 21 acting as a stop for the front cylindrical part 7 of the element 4 to limit the axial travel due to the bias of the return force exerted by the spring 20.

Between the front face 12 of the sleeve 10 and the corresponding rear face of the head 11 there is fitted an annular seal 22. Between the external peripheral surface of the front part 7 of the element 4 and the internal peripheral surface of the sleeve 10 of the element 9 there are fitted two other annular seals 23, 24.

At the rear, the first element 4 comprises a cylindrical part 25 axially separated from the sleeve 10, and having an external diameter slightly greater than the external diameter of the sleeve 10.

The connection device 1 also comprises coupling means 26 composed of two longitudinal arms 27, 28, articulated on the rear part 25 of the element 4 by means of diametrically opposed radial pivots 29, 30. The other opposite ends of the arms 27, 28 are connected by a cross-member 31.

The length and separation of the parallel arms 27, 28 allow a pivoting movement around the pivots 29 and 30 coaxially surrounding the element 9. The cross-member 31 is equipped with an axial recess 32 protruding out with respect to the head 11, and designed to surround the duct 3 with clearance.

The connection device 1 can be used in the following manner:

The end of the duct 2 is first fixed to the rear of the first element 4, notably by screwing by means of a nut 2a, so as to ensure that the duct 2 communicates with the axial passage 8. Opposite, the end of the other duct 3 is applied in abutment on the seal 16 of the head 11.

The spring 20 is then compressed following an axial movement bringing the two elements 4 and 9 towards one another. The arms 27, 28 of the coupling means are then actuated to the active position, in which the cross-member 31 cooperates with an end-piece 33 of the duct 3, stopped up against an external shoulder 34. The duct 3 passes axially through the recess 32 of the cross-member 31, and the arms 27, 28 extend in the longitudinal direction.

Due to the effect of the spring 20, the end of the duct 3 is held permanently pressed against the seal 16. The pressure of the fluid inside the passage 35 between the sliding elements 4, 9 acts on the opposite faces 6 and 18 of the internal space 19 and tends to move the element 9 to the right to increase the crushing force of the seal 16 between the head 11 and the end of the duct 3. Consequently, the greater the fluid pressure, the greater this crushing force and the better the tightness. Moreover, pressures lower than the external pressure can be applied, as the head 11 continues to apply the seal 16 in abutment against the duct 3, due to the action of the spring 20.

The connection device 1 can be fitted and removed quickly, and moreover presents remarkable tightness qualities directly proportional to the value of the pressure of the fluid conveyed. In addition, it can be coupled to ducts 3 of different sizes and shapes, after the head 11 has been interchanged.

With reference to FIG. 3, the assembly device is used to form a blanking plug sealing off the duct 3. The assembly device 36 comprises a solid element 37, and an external cylindrical part 38 engaged around the sleeve 10 in order to improve the axial guiding of the sleeve. The ends of the arms 27, 28 of the coupling means 26 are supported by the element 37. This assembly device 36 forming an end plug for the duct 3 operates in the same way and presents the same advantages as the connection device 1.

According to the alternative embodiment of FIG. 4, the same reference numbers will be used to designate similar parts to those of FIG. 1. The tightness of the internal space 19 is achieved by means of a metal bellows 40, for example made of stainless steel, welded onto shoulders of the head 11, and of the end-piece 41, to which the duct 2 is connected. The end-piece 41 also bears an annular sleeve 42 acting as linking interface part for protection and axial guiding of the bellows 40. It is clear that the bellows 40 can be made of another material, notably plastic or rubber.

The presence of the bellows 40 with axial expansion enables perfect tightness of the space 19 to be achieved, and the seals 23, 24, 22 of the device of FIG. 1 are then no longer required.

In the two devices of FIGS. 1 and 4, it can be noted that the diameter of the support face of the seal 16 between the head 11 and the end of the duct 3 is smaller than the diameter of the internal space 19 filled with fluid under pressure. This difference of diameters enables a multiplying effect of the abutment force of the seal 16 against the end of the duct 3 to be obtained.

The hollow part 3 may have any cross-section without the tightness being affected thereby.

I claim:

1. An assembly device for connecting a first element to a tubular part equipped with a fluid channel, the assembly device comprising:

a second element axially slidingly mounted relative to the first element and sealing means for sealing the second element to said first element, a first axial through passage arranged in the second element, coupling means, having a holding part for connecting mechanically the first element to the tubular part in a predetermined axial position, with in which the second element presses axially around an opening of the fluid channel of the tubular part, allowing communication of the channel with the first axial passage, a first seal fitted in axial abutment between the second element and the tubular part, and an internal space extending in the axial direction between opposite faces respectively of the first and second elements, the fluid flowing through the space which is in communication with the first axial passage of the second element.

2. The device according to claim 1, wherein the second element comprises a removable head equipped with a support face for the first seal, a sleeve for allowing axial sliding of a front part of the first element, and means for fixing the removable head against a face of the sleeve.

3. The device according to claim 2, wherein the sleeve comprises radially extending stop means for limiting the axial sliding movement of the second element with respect to the first element.

4. The device according to claim 2, wherein said sealing means includes a second seal is fitted between the front part of the first element and the sleeve of the second element.

5. The device according to claim 2, wherein a spring is fitted between the first and second elements to increase the force on the first seal mounted in abutment against the tubular part, the spring extending in the space between the opposite faces of the first and second elements.

6. The device according to claim 1, wherein a spring is fitted between the first and second elements to increase the pressure on the first seal mounted in abutment against the tubular part, the spring extending in the space between the opposite faces of the first and second elements.

7. The device according to claim 1, wherein the holding part grips the tubular part in a zone adjacent the first seal.

8. The device according to claim 7, wherein the coupling means includes at least one pivoting arm mounted on a pivot of the first element.

9. The device according to claim 1, wherein the first and second elements each present a circular cross-section, the second element comprising a protuberance equipped on the front face with the first seal and comprising an axial cylindrical extension extending into the fluid channel of the tubular part so as to be centered with respect to the tubular part.

10. The device according to claim 1, wherein the tubular part comprises a hollow duct coming into axial abutment against the second element, the first element comprising a second axial through passage, in communication with another duct connected to the source of fluid under pressure.

11. The device according to claim 1, wherein the first element constitutes a blanking plug for sealing off the fluid channel of the tubular part.

12. The device according to claim 1, wherein the first seal has a support face and the diameter of the support face of the first seal is smaller than the diameter of the internal space filled with fluid under pressure, to obtain a multiplying effect of the abutment force of the first seal against the tubular part.

13. The device according to claim 12, wherein the second element is urged against the tubular part by the pressure of the fluid in the space, the abutting force of the first seal being dependent on the pressure.

14. The device according to claim 1, wherein the second element has a head and the first element has an end piece, wherein said sealing means comprises an axial expansible bellows mounted in the internal space and sealingly fastened to the head of the second element and the end-piece of the first element, said first element fixedly joined to a duct.

15. The device according to claim 1, wherein the second element is urged against the tubular part by the pressure of the fluid in the space, the abutting force of the first seal being dependent on the pressure.

* * * * *